United States Patent [19]

Crawford et al.

[11] 3,757,864

[45] Sept. 11, 1973

[54] FRICTION REDUCING AND GELLING AGENT FOR ORGANIC LIQUIDS

[75] Inventors: David Lee Crawford; Robert Brooks Earl, both of Tulsa, Okla.; Roger F. Monroe, Midland, Mich.

[73] Assignee: The Dow Chemical Company, Midland, Mich.

[22] Filed: May 12, 1971

[21] Appl. No.: 142,783

Related U.S. Application Data

[63] Continuation-in-part of Ser. No. 16,591, March 4, 1970, abandoned.

[52] U.S. Cl............... 166/308, 137/13, 252/8.55 R
[51] Int. Cl............................................... E21b 43/26
[58] Field of Search........................... 166/280, 308; 137/13; 252/8.55 R; 260/439 R, 448 R

[56] References Cited
UNITED STATES PATENTS

| | | | |
|---|---|---|---|
| 3,692,676 | 9/1972 | Culter et al......................... | 166/308 |
| 3,505,374 | 4/1970 | Monroe............................ | 260/439 R |
| 3,494,949 | 2/1970 | Monroe, Rooker............. | 260/448 R |
| 3,136,361 | 6/1964 | Marx................................. | 166/308 |

*Primary Examiner*—Marvin A. Champion
*Assistant Examiner*—Jack E. Ebel
*Attorney*—Griswold & Burdick, Bruce M. Kanuch and Lloyd S. Jowanovitz

[57] ABSTRACT

The pressure drop of a confined non-polar organic liquid in motion due to friction is markedly lessened by admixing with the liquid an effective amount of one or more aluminum salts of an aliphatic orthophosphate ester. By increasing the concentration of the aluminum salts of the aliphatic orthophosphate ester so that a gelling quantity is present, the organic liquid can be gelled to provide for example a fracturing fluid for oil and gas wells wherein hard particulate material may be suspended to serve as proppants in the resulting fractures.

16 Claims, No Drawings

FRICTION REDUCING AND GELLING AGENT FOR ORGANIC LIQUIDS

CROSS-REFERENCE TO RELATED APPLICATION

This application is a continuation-in-part of application Ser. No. 16,591, filed Mar. 4, 1970, now abandoned.

BACKGROUND OF THE INVENTION

It is well known that, in movement of fluids, friction is created and thus energy must be expanded to overcome it. Since fluids used in industrial plants and treatment of wells are most conveniently moved by pumping or air pressure, this loss is both apparent and measurable from the pressure drop shown in moving the fluids through a given distance. The pressure drop is approximately proportional to the square root of the velocity of the fluid. Thus, in an operation where high velocity is required, such as in fracturing of oil and gas wells, extremely high pressue drops are encountered, resulting in a loss of a large amount of energy during movement of the fluid. In fracturing earth formations penetrated by a well, it is essential to inject a sufficient amount of the fracturing fluid to build up the required pressure in the well to produce cracks or fractures in the earth formation. Pressues of many thousands of pounds, sometimes of 10,000 pounds per square inch (measured at the surface are often required to effect the required fracturing. Since some seepage of the fluid being pumped into the well occurs, it is necessary to inject the fluid into the well at sufficiently high velocities to obtain the required pressure build-up to force apart rock in the formation, i.e., fracture.

The required greater velocity requires, generally, a greater volume of fluid for movement and this in turn requires higher horsepower (energy input) which increases costs, if indeed, adequate power is even attainable. Ofttimes, as in well fracturing, larger cross-sectional boreholes are necessary in order that sufficient volume and hence pressure be attained to fracture the formation. The use of fluid-loss control additives in the fracturing fluid (to inhibit entrance of the fluid into the more accessible and porous sections and divert fluid to less porous strata) is of great help, to reduce seepage into the formation which seepage impedes the pressure build-up that is necessary for fracturing, but however, in many instances, the friction in the lines remains too high for successful operation.

Accordingly a more effective method whereby the friction loss due to the movement of the fluid along pipes, conduits, tubes, coils and the like is reduced, is greatly desirable.

A number of additaments other than fluid-loss control agents are generally added to fracturing fluids to change the physical properties of the fluid or to serve some other beneficial function. Generally a propping agent, such as sand or other hard particulate material, is added which will serve in the formation as a propping agent to keep the fractures propped open after completion of the fracturing operation and release of the hydrostatic pressure. Often an agent is added to increase the viscosity of the fluid exerting hydrostatic pressure so that the propping agent may be maintained in a dispersed state within the fluid during injection and emplacement.

In addition to the above ingredients of well treating fluids, corrosion inhibitors, foam inhibitors, paraffin solvents, compositions to attack the formation rock chemically, wetting agents, and the like may also be incorporated therein. The composition of a fracturing fluid is generally adjusted as required dependent upon the nature of the geologic formation to be fractured. For example, in fracturing certain types of formation it may be desirable to use a high concentration of the propping agent, while in another formation, very little or no propping agent may be desired. In other words, in each situation, the additaments and the amounts thereof are controlled in accordance with the formation and the results desired. Thus, it is desirable in adding agents to a fracturing fluid to have an agent which will contribute a certain factor to the fracturing fluid without appreciably adversely affecting other desirable characteristics of the fluid. Control of the fluid is simplified if an ingredient can be added which effectuates reduction in pressure drop (due to friction within the fluid being moved) without materially lessening the other properties of the fluid. Additional value would be obtained if the ingredient increased fluid viscosity while reducing friction pressure.

It is a universal experience (as above indicated) that the pressure drop of a liquid being moved through a pipeline or the like in conventional usage is of such magnitude that more energy must be provided to maintain a satisfactory rate of movement. Prior to a highly valuable innovation made known through the U.S. Root Pat. No. 3,254,719 (whereby loss of velocity due to friction was lessened by an additament to the fluid being moved) the requirement for maintaining energy requirements had been met in practice by putting greater pressure on the liquid in movement, either in the initial stage or somewhere along the confined flow, e.g., pipeline. An inescapable concomitant thereof in well treating operations was increased pumping costs thus necessitated in overcoming the pressure drop due to friction; such increased costs were appreciable and accordingly costly.

Conditioning of the oil-base fluid being moved, either for improved transfer purposes or well treating purposes, is thus seen to be of extensive economic significance. Additaments employed to attain this objective must, in addition to lessening the pressure loss and otherwise be fully acceptable, be non-shear degradable and be easily dissolved in the fluid being moved, using equipment commonly employed in well treating operations. Among the materials known to have been used in attempts to lessen the pressure drop of fluids in motion are certain resins, e.g., polyisobutylene and polyacrylamide. Such resins fail to meet fully the requirements of an additament for this purpose because they tend to degrade under normal use conditions.

Since the liquid vehicles employed in fracturing operations (wherein fluid is injected into a subterranean formation, via a well penetrating it, at sufficient pressure to force part or cleave the formation along certain lines within the formation thereby creating flow channels) are often medium-density petroleum fractions, e.g., kerosene, a gas oil, diesel oil, or the like, an especial need therefore exists for a friction-reducing agent for such medium density petroleum fractions.

Several metal salts of phosphate esters and methods for their preparation are well known in the art, e.g., U.S. Pat. Nos. 3,505,374; 3,494,949; 2,983,678; and 2,983,679. The teachings of these patents are specifically incorporated herein by reference.

SUMMARY OF THE INVENTION

The invention is a method of decreasing friction within a confined essentially non-polar organic or oil-base liquid being moved, due both to that created among the molecules of the liquid and between the body of liquid and the walls retaining it, e.g., transfer lines, pipes, tubing, or the like, the invention thereby lessening pressure loss and pumping costs which method comprises admixing with the liquid as a friction-reducing additament, in the amount of at least about 0.5 and preferably at least about 1.0 pound to about 100 pounds per 1,000 gallons of the liquid, an aluminum salt of an aliphatic substituted orthophosphate ester and maintaining at least about one pound thereof per 1,000 gallons of oil-base liquid during the transfer or moving period. The aliphatic-substituent may be straight or branched chain and may be alkyl, alkenyl, and/or alkynyl. Combinations thereof within the same molecule and mixtures thereof are quite acceptable.

By increasing the concentration of the aluminum salts of the aliphatic orthophosphate ester above that needed for friction reduction, a gelling quantity can be reached. To enhance the ability of the hydrocarbon fluid to maintain solid particles in suspension, a gelling quantity of an aluminum salt of an aliphatic substituted orthophosphate ester is required. This gelling quantity varies in amount from at least about 20, and preferably at least about 40, pounds per 1,000 gallons of the organic liquid to about 400 pounds per 1,000 gallons of the organic liquid. The consistency of the gel is usually limited only by the requirement that, in fracture treatments for oil-producing formations, the gelled fluid must be pumpable. Also, for this particular application, if the gel gets too thick it becomes difficult to evenly disperse solid particles, such as sand grains, throughout the gelled liquid. The gelled liquid has many advantages for use in fracturing oil-producing formation, i.e., it does not affect water sensitive formations, it thins by chemical action and is not dependent upon dilution with formation fluids, it does not form a precipitate upon such dilution and therefore has low formation damage properties, the viscosity of the gel remains almost constant over a wide temperature use range, fluid-loss control can be obtained economically, and the system has excellent sand carrying capacity.

The aluminum aliphatic orthophosphate ester additament for organic or oil-base liquid, in order to attain the objectives of the invention, includes those wherein the alkyl groups are selected from for example methyl, ethyl, propyl, isopropyl, isobutyl, t-butyl, butyl, amyl, hexyl, octyl (caprylyl), nonyl, decyl, undecyl, dodecyl (aluryl), tridecyl, tetradecyl (myristyl), pentadecyl, hexadecyl, heptadecyl, octadecyl (stearyl), nonadecyl, eicosyl, and, as aforesaid, combinations of straight and branched chain alkyls within the same molecule and mixtures of various straight and branched chain dialkyls. They also include the corresponding unsaturated straight and branched chain aliphatics, viz. alkenyls, and alkynyls.

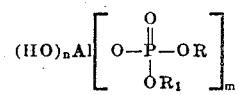

wherein $m = 1$ to 3 wherein $n = 2$ to 0, $m = 1$ to 3, and $n + m = 3$, and wherein R and $R_1$ are independently $C_1$ to $C_{20}$ alkyls, or $C_2$ to $C_{20}$ alkynyls. Also R or $R_1$ but not both may be H. It is understood that the aluminum salt of any combination of these esters may be employed as the additament to the oil-base liquid being transferred. It is obvious that where there is no OH, i.e., n is zero, the orthophosphate group integer, i.e., $m$ is 3 and when n is 2, then $m$ is 1. It is also clear that any arithmetical value above zero but not more than 3 is an average and may be 1.25 to 2.4 or the like for the orthophosphate group. Specific additaments, illustrative only, of the type required to be used in the practice of the invention, are: aluminum salt of methyltetradecylorthophosphoric acid ester, aluminum salt of methyldodecylorthophosphoric acid ester, aluminum salt of alkenyloctylorthophosphoric acid ester, or aluminum salt of propynyldecynylorthophosphoric acid ester. For ease of expression the aliphatic-substituted aluminum orthophosphate may often be referred to merely as the alkyl ester or salt, although it is understood that the unsaturated hydrocarbon radicals are included.

The aluminum salt of aliphatic orthophosphate ester can be prepared by any suitable procedure known in the art. One such procedure is described in *Industrial and Engineering Chemistry*, Vol. 34, page 20 et seq. (1942); in *Chemical Industries* L1, 4, page 516 et seq. (1942); in U.S. Pat. No. 3,494,949 and the like.

The procedure generally requires reacting an orthophosphoric acid ester (e.g., prepared by reacting a selected alcohol or mixture of alcohols) with a phosphorous compound such as phosphorous pentoxide, phosphorous oxychloride, $PCl_5$, $PF_5$, etc. with a basic aluminum compound. Suitable aluminum compounds include for example sodium aluminate, aluminum isopropoxide, hydrated alumina or the like.

The aluminum salt, as described above, may be admixed with the organic liquid in any convenient manner which results in adequate mixing at a relatively early stage in the movement of the liquid. For example, the additament at either full strength, or more usually diluted by kerosene or the like, may be bled at a controlled or gauged rate into a transfer line or into a pump employed in the operation or by both techniques or it may be admixed in a storage vessel prior to its entrance into the tubing, lines, or the like. When used in connection with fracturing a fluid-bearing formation (which constitutes one of the most important applications of the method of the invention) the additament may be injected into any of the storage vessels, pumps, surface lines or tubing or casing, dependent upon the particular arrangement, type of treatment, and convenience, preferably being admixed at a relatively early stage in the operation.

The recommended procedure to follow is to admix between about 0.5 and about 100 pounds by weight of the selected aluminum alkyl or alkenylorthophosphate per 1,000 gallons of gasoline, oil, diesel oil, crude oil or kerosene, one of which is commonly employed because of availability and economy. In practicing the invention to fracture a geologic formation, the usual pumping equipment and the general layout conventionally employed, other than the admixture of the selected aluminum alkylorthophosphate, may be employed.

In fracturing operations it is especially beneficial to follow the following procedure.

A predetermined amount of a frac oil (e.g., kerosene or diesel oil) is placed in a clean frac tank. The necessary amount of a previously prepared aliphatic orthophosphate ester (reaction or an alcohol with a phosphorous compound) and a suitable aluminum are blended into the frac oil to give a final desired viscosity. It is important that no substantial premixing of the aluminum compound and ester occur prior to being blended into the oil, as this effects the rate of gellation and final viscosity of the frac oil. The frac oil is continuously stirred or otherwise agitated until the gel forms.

It has been found that maximum gel strength depends not only upon the amount of aluminum salt present but when an organic liquid is gelled by separately adding an aluminum compound and an ester, also upon the eight ratio of the reactants. The preferred ratios for any given reactants can be readily determined by simple laboratory procedures wherein the total amount used ratio of specific reactants are varied until a specific viscosity or maximum viscosity is achieved in a specific organic liquid.

Organic liquids in which the novel friction reducing and gelling agent can be employed are generally nonpolar and include for example aliphatic and aromatic hydrocarbons, and mixtures thereof, refined paraffinic oils, e.g., lubricating oils, kerosene, diesel oils, some crude oil mixtures of these and the like. The effectiveness of any particular aluminum salt in any specific organic liquid should be determined prior to a large scale operation.

By the practice of the invention, the friction within the body of an oil-base liquid can be reduced as much as 30 percent to 40 percent when employing a concentration of 2 to 2½ pounds of the selected aluminum alkylorthophosphate per thousand gallons of an oil-base liquid, e.g., kerosene, and not display any of the shear degradation commonly associated with known friction reducing additaments in a fluid being moved.

The use of higher concentrations (e.g., 5 – 65 lbs) per 1,000 gallons maintains the improved friction reduction but also increases fluid viscosity. This increase in viscosity aids in supporting admixed solid particles, if and when, the pump rate is reduced so the fluid is no longer in turbulent flow. At normal high pump rates, the viscosity has little or no effect on the fracturing fluid. If viscosity within the fracture is undesirable, this may be reduced by addition of an appropriate gel breaker which functions slowly to break the gel in 4 – 48 hours. Once the gel is broken this also destroys the friction reducing properties of the additive.

The following comparative tests and examples of the invention were conducted. For simplicity of expression the term "alkyl" will often be used herein although the same statements apply to alkenyls or mixtures of alkyls and alkenyls. The extent of lessening of friction was measured according to the following procedures.

Percent Friction Reduction Test Procedure

The test equipment consists of a ¼ inch inside diameter stainless steel tube approximately 8 feet in length, with two pressure gauges placed 6 feet apart such that neither gauge is at the end of the tubing. A pump is employed such that the flow rate of the fluid in the tube can be varied from 0 to 5.55 gallons per minute. Such control can be achieved by a variable speed pump motor, or by positioning in the input line a fluid by-pass valve. An inline flow meter is necessary to determine flow rates of the fluid being pumped. The entire system is constructed with a 1 gallon fluid reservoir such that the fluid being tested can be continuously circulated.

A test fluid is prepared by admixing one of the above aluminum alkylorthophosphates in a liquid hydrocarbon. This test fluid is advisedly compared to a fluid blank which is the same liquid hydrocarbon subjected to the same test but with no additament.

The control fluid or blank for comparative purposes is placed in the reservoir and pumped at several different flow rates. At the flow rates, hereafter sometimes called Q values, the pressure (P) at each end of the 6 foot section of tubing, are read to obtain a differential pressure P. The fluid with the additament was treated in the same manner to obtain several Q valves and corresponding P values.

For each fluid, the differential pressure, i.e., P, is plotted against the flow rate Q, on logarithmic 1 cycle × 1 cycle graph paper. The best straight line is thereafter drawn through the points thus plotted for each fluid. Considering the line for the control fluid, or blank, a value for the flow rate Q is selected, say 3.5 gallons per minute, and corresponding p is read. The differential pressure p for the test solution is read from the graph at the flow rate Q selected above. The per cent friction reduction is then calculated by the following equation:

$$\text{Percent friction reduction at constant Q} = \frac{(\text{P of blank fluid} - \text{P of liquid hydrocarbon with additament})}{\text{P of blank fluid}} \times 100$$

Comparative Tests and Examples of the Invention

Examples of the preparation of alkylorthophosphoric acid esters and the preparation of the aluminum salts of these esters suitable for use in the practice of the invention follow.

Example 1

Preparation of methyldodecylorthophosphoric acid ester

The equipment consists of a 2-liter round-bottom flask equipped with a mechanical stirrer, reflux condenser, dropping funnel, and thermometer.

A total of 400 milliliters of dry hexane is placed in the 2-liter flask, then 142 grams (1 mole) of $P_2O_5$ are added and stirred to form a slurry.

Three hundred seventy-two grams (2 moles) of dodecyl alcohol and 64 grams (2 moles) of methyl alcohol are mixed together and added via dropping funnel to the hexane and $P_2O_5$ slurry with rapid stirring. Cooling is required to keep the reaction temperature below 40°C.

After the alcohols have been added, the reaction mixture is heated to and maintained at a temperature such that the hexane will reflux for 1 hour.

The hexane is thereafter removed by distillation, the last traces being removed under a reduced pressure reading of 100 millimeters mercury.

Example 2

A method for the preparation of aluminum salt of methyldodecylorthophosphoric acid ester, comprises:

Admixing in a 2-liter flask equipped with a mechanical stirrer and thermometer 700 milliliters of water and 200 milliliters ethanol. NaOH (19.8 grams), dissolved in 100 milliliters of water, are added to the water and ethanol mixture. Methyldodecylorthophosphoric acid ester (140 grams) are added and mixed well. A solution of 82 grams of $Al_2(SO_4)_3 \cdot 18H_2O$, dissolved in 100 milliliters water, is added accompanied by rapid agitation. The finely dispersed precipitate is thereafter filtered and washed with water. The filtered and washed precipitate is dried under mild temperature under at least a partial vacuum.

Variations in the preparations given in the first two examples may be made if desired. One such variation which is illustrative for preparing the alkylorthophosphoric acid ester is described below as Example 3.

Example 3

A second method (in addition to that of Example 1) for the preparation of ethyltetradecylorthophosphoric acid ester comprises admixing 90 milliliters of ethyl alcohol and 332 grams of tetradecyl alcohol are added to a 1-liter flask equipped with a mechanical stirrer and thermometer. The alcohols are heated while stirred to approximately 50°C to melt the tetradecyl alcohol. The alcohols are then mixed well together.

Very slowly and cautiously 110 grams of dry phosphorus pentoxide ($P_2O_5$) are added directly to the mixture of alcohols contained in the flask. Stirring is maintained at a rate adequate to disperse with a minimum delay the $P_2O_5$ into the alcohols. Cooling may be necessary. Temperature should not be allowed to exceed 80°C. After all the $P_2O_5$ has been added, the materials in the flask are heated if necessary to 80°C and held thereat for 1 hour.

An "in situ" preparation of the aluminum salt of an alkylorthophosphoric acid ester (Example 2 being a pre-prepared salt) is illustrated in Example 5 below.

Example 4

A third method (in addition to that of Examples 1 and 3) for the preparation of ethyltetradecylorthophosphoric acid ester comprises admixing 90 milliliters of ethyl alcohol and 332 grams of tetradecyl alcohol are added to a 1-liter flask equipped with a mechanical stirrer and thermometer. The alcohols are heated, while stirred, to approximately 50°C to melt the tetradecyl alcohol. The alcohols are then mixed well together.

Very slowly and cautiously 110 grams of dry phosphorous pentoxide ($P_2O_5$) are added directly to the mixture of alcohols contained in the flask. Stirring is maintained at a rate adequate to disperse with a minimum delay the $P_2O_5$ into the alcohols. Cooling may be necessary. Temperature should not be allowed to exceed 80°C. After all the $P_2O_5$ has been added, the materials in the flask are heated if necessary to 80°C and held thereat for 1 hour.

This reaction product may be diluted with 50 – 5,000 ml fluid hydrocarbon and activated when desired to have friction reducing properties by the admixing of 1.05 grams of sodium aluminate (38 percent in aqueous solution). Viscosity, if any, will be noted when the stoichiometric balance is achieved using sodium aluminate. Friction reducing properties have been measured with concentrations of reaction product (above) as low as 0.01 percent by volume in the hydrocarbon carrier. Viscosity with subsequent friction reduction is noted when reaction product concentration approaches 0.5 percent by volume in the hydrocarbon carrier. To achieve gellation of a hydrocarbon fluid for use in well fracturing treatments, thereby enhancing the capability of the fracturing fluid to maintain solid particles in suspension, a higher concentration of reaction product is required. In most instances, the gelling quantity of reaction product required for a refined oil containing no additives is less than the gelling quantity required for a crude oil.

Example 5

Ten grams of methyl tetradecylorthophosphoric acid ester is placed in 500 milliliters of kerosene contained in a 1-liter beaker or open top flask equipped with mechanical stirrer and thermometer. The flask and contents are heated to approximately 110°F at which temperature the ester dissolves into the kerosene. At this temperature, 1.27 grams of hydrated alumina are added and mixed well into the kerosene and methyltetradecylorthophosphoric acid ester mixture. With gentle stirring of the contents, the flask is then heated to 190°F at which temperature timing is begun. The temperature is allowed to rise to 215°F. After 40 minutes have elapsed as timed from the temperature of 190°F, the flask and contents are allowed to cool.

Comparative tests not illustrative of the invention follow.

Comparative Test 1

Tests were conducted to show that the intermediate materials used to prepare the aluminum salts of alkylorthophosphoric acid esters do not give any friction reduction in kerosene. First, typical alcohols used as sources of the alkyl groups were tested for friction reduction in kerosene according to test procedure previously described. The results are shown below.

TABLE I

Friction Reduction Test on Typical Alcohols Used as Sources of Alkyl Groups in Kerosene

| Name of Alcohol | Concentration of Alcohol in lb/1000 gallons Kerosene | % Friction Reduction |
|---|---|---|
| Kerosene only (blank) | 0 | 0 |
| Octyl | 2.2 | 0 |
| Dodecyl | 2.2 | 0 |
| Tetradecyl | 2.2 | 0 |
| Hexadecyl | 2.2 | 0 |

It can be readily seen that no lessening of friction occurred.

Comparative Test 2

Typical alkylorthophosphoric acid esters prepared according to the procedure illustrated in Example 1 were tested for friction reduction according to the test procedure previously described. The results of these tests are shown below.

TABLE II

Friction Reduction Test on Typical Alkylorthophosphoric Acid Ester in Kerosene

| Name of Alkyl Groups of Orthophosphoric Acid Ester | Concentration of Ester in lb/1000 Gallons Kerosene | % Friction Reduction |
|---|---|---|
| Kerosene only (blank) | 0 | 0 |
| Didodecyl | 2.2 | 0 |
| Methyl dodecyl | 2.2 | 0 |
| Methyl decyl | 2.2 | 0 |
| Octyldodecyl | 2.2 | 0 |
| Ethylhexadecyl | 2.2 | 0 |

As in Table I no lessening of friction occurred.

The following Examples numbered 6 to 13 are illustrative of the practice of the invention.

Example 6

This example shows that aluminum salts of alkylorthophosphoric acid esters give significant friction reduction when admixed with an oil during or prior to its movement. The alkylorthophosphoric acid esters were prepared by the method as described in Example 1. The aluminum salts were prepared according to the method as described in Example 2. The resulting aluminum salts of alkylorthophosphoric acid esters were placed in kerosene and tested for friction reduction according to the test procedure previously described.

The compounds and corresponding friction reduction in kerosene are listed in the following tables. The compounds have the structure:

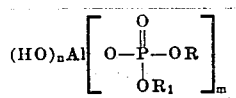

wherein
$m = 2$ to $1$,
$n = 1$ to $2$,
and $m+n = 3$.

The $R_1$ and $R$ alkyl and alkenyl groups of the acids employed initially in the preparation of the esters are as listed in Table III.

The friction reduction tests were run at a concentration of 1 gram of salt/1 gallon of kerosene or 2.2 lb/1,000 gallons of kerosene.

TABLE III

Friction Reduction Test Results in Kerosene of Typical Aluminum Salts of Alkylorthophosphoric Acid Esters

| $R_1$ | R | % Friction Reduction |
|---|---|---|
| ethyl | octyl | 24 |
| propyl | octyl | 12 |
| butyl | octyl | 30 |
| octyl | octyl | 21 |
| methyl | decyl | 5 |
| methyl | dodecyl | 34 |
| ethyl | dodecyl | 46 |
| propyl | dodecyl | 24 |
| isopropyl | dodecyl | 5 |
| butyl | dodecyl | 5 |
| butyl | dodecyl | 7 |
| decyl | dodecyl | 9 |
| dodecyl | dodecyl | 28 |
| methyl | tetradecyl | 39 |
| ethyl | tetradecyl | 39 |
| n-propyl | tetradecyl | 12 |
| octyl | tetradecyl | 6 |
| dodecyl | tetradecyl | 10 |
| tetradecyl | tetradecyl | 6 |
| methyl | hexadecyl | 5 |
| ethyl | hexadecyl | 12 |
| n-propyl | hexadecyl | 8 |
| isopropyl | hexadecyl | 5 |
| butyl | hexadecyl | 7 |
| hexadecyl | hexadecyl | 5 |
| ethyl | octadecyl | 10 |
| n-propyl | octadecyl | 16 |
| butyl | octadecyl | 16 |
| butyl | 9-octadecenyl | 7 |
| hexyl | 9-octadecenyl | 11 |
| octyl | 9-octadecenyl | 8 |
| kerosene blank | | 0 |

The results of Table III clearly show the marked improvement in lessening of friction (or energy loss) of liquids in motion.

Example 7

This test is a further example of the invention (except the blank). A variation in the preparation of the alkylorthophosphoric acid esters was followed here, viz. that of Example 3, wherein the $P_2O_5$ was slowly added to the alcohols (whereas in Example 1 the alcohols were slowly added to $P_2O_5$).

The alkylorthophosphoric acid esters (thus prepared as in Example 3) were converted to their aluminum salts according to the procedure given in Example 2 and these aluminum salts were tested for friction reduction according to test procedure previously described. The results are shown in Table IV.

TABLE IV

Friction Reduction Test Results, Employing in Kerosene, Aluminum Salts of Alkylorthophosphoric Acid Esters Prepared According to Procedure of Example 3

| Name of Aluminum Salt | Concentration of Salt as lbs/1000 Gallons of Kerosene | % Friction Reduction |
|---|---|---|
| Kerosene only (blank) | 0 | 0 |
| Aluminum methyldodecyl-orthophosphate | 2.2 | 8 |
| Aluminum ethylododecyl-orthophosphate | 2.2 | 20 |
| Aluminum methyltetra-decylorthophosphate | 2.2 | 30 |
| Aluminum ethyltetra-decylorthophosphate | 2.2 | 26 |

Reference to TABLE IV shows convincingly the highly desirable reduction in friction of the kerosene in motion.

Example 8

This test further illustrates the practice of the invention.

In the instant example, methyltetradecylorthophosphoric acid ester was prepared according to the procedure of Example 3. This ester was then used in the procedure given in Example 5 in which the aluminum salt was prepared in situ as a liquid concentrate of aluminum salt.

One hundred and seven milliliters of the liquid concentrate so prepared were diluted to make 1 gallon in kerosene and mixed well. This resulting fluid was then tested for friction reduction according to test procedure previously described. The results are given in Table V below.

TABLE V

Friction Reduction Test Results for Aluminum Salt of Methyltetradecylorthophosphoric Acid Ester Prepared "In Situ" (Example 5) as a Liquid Concentrate in Kerosene

| Volume of Liquid Concentrate prepared in Example 5 Diluted to 1 gallon Kerosene | Concentration of Aluminum Salt in lb/1000 Gallons of Kerosene | % Friction Reduction |
|---|---|---|
| None | Kerosene blank | 0 |
| 107 milliliters | 5.0 lbs | 47 |

As can be observed, the results are very good.

Example 9

When Example 8 above is repeated employing a alkenyl orthophosphate of aluminum or monoalkyl-monoalkenyl orthophosphate of aluminum, the extent of lessening the friction effects is substantially that of Example 8.

Example 10

When Example 8 above is repeated employing an aluminum aliphatic-substituted orthophosphate wherein one aliphatic radical is an alkenyl, the lessening of loss due to friction is substantially that attained in Example 8.

Example 11

The liquid concentrate prepared by procedure illustrated in Example 5 and employed in Example 8 was used to prepare other test fluids for friction reduction tests. Test fluids with low concentrations of aluminum methyltetradecylorthophosphate were prepared to fine the efficacy of such aluminum salts at low concentrations. The results of these tests are shown in Table VI.

TABLE VI

Per Cent Friction Reduction of Test Fluids Containing Low Concentrations of Aluminum Methyltetradecylorthophosphate. Test Fluids were Prepared from Liquid Concentrate Described in Example 5

| Volume of Liquid Concentrate in Example 5 Diluted to 1 Gallon Kerosene | Concentration of Aluminum Salt in lb/ 1000 Gallons Kerosene | % Friction Reduction |
|---|---|---|
| Kerosene only (blank) | 0 | 0 |
| 107 milliliters | 5.0 | 47 |
| 42.8 milliliters | 2.0 | 17 |
| 21.4 milliliters | 1.0 | 5 |
| 10.7 milliliters | 0.5 | 2 |
| 2.14 milliliters | 0.1 | 0 |
| 1.07 milliliters | 0.05 | 0 |
| 0.2 milliliter | 0.01 | 0 |

Example 12

Typical aluminum salts of alkylorthophosphoric acid esters were placed in liquid hydrocarbons other than kerosene and tested for friction reduction. Salt O O

TABLE VII

Per Cent Friction Reduction of Aluminum Methyltetradecylorthophosphate (Designated A) and Aluminum Ethyltetradecylorthophosphate (Designated B) in Selected Liquid Hydrocarbons

| Liquid Hydrocarbon | Aluminum salt | Concentration of Aluminum Salt in lbs/1000 Gallons Liquid Hydrocarbon | % Friction Reduction |
|---|---|---|---|
| Partially refined crude oil (blank) | 0 | 0 | 0 |
| Partially refined crude oil | B | 11 | 50 |
| No. 2 diesel oil (blank) | 0 | 0 | 0 |
| No. 2 diesel oil | B | 11 | 59 |
| Untreated crude oil | O | 0 | 0 |
| Untreated crude oil | A | 88 | 23 |

The aluminum salts were found to give significant friction reduction in the liquid hydrocarbon tested as given in Table VII above.

By the practice of the invention it is obvious that marked lessening of friction and lessening of the undesirable accompaniment of increased energy requirement are attained by the practice of the invention.

Example 13

To further illustrate the practice of the invention, an oil producing well was fractured using chemicals manufactured by the process described in Example 4. This well could not be fractured economically by previously known techniques because the formation was sensitive to water and would be damaged by some aqueous fluids. Previously known oil base fluids could not be pumped down the 2½ inch tubing in the well at a rate high enough to initiate the fracture and carry adequate sand proppant. The well was producing from a formation 9,000 feet below the surface. To fracture the formation, a total of 36,000 gallons of kerosene which contained 777 pounds of ethyl dodecyl orthophosphate, was injected into the well. Immediately prior to injection, 60 gallons of an aqueous solution containing 38 percent (by weight) of sodium aluminate was added to attain friction reducing properties and to gel the 36,000 gallons of kerosene. The gel viscosity was 900 centipoise, as measured on a Brookfield LVF viscosimeter with No. 3 spindle at 60 rpm. The gelled kerosene was pumped at a fracturing rate of 14.0 bpm down the 2½ inch (i.d.) tubing to create a fracture. The resulting fracture was packed with 78,200 lbs of 10–20 mesh sand which was added during the treatment at concentrations up to four pounds per gallon of gelled kerosene. The maximum pump rate of kerosene without a friction reducing material would be 9 bpm at the 6,900 psi pressure limit imposed by the well operator, which would have been an inadequate rate to create and pack a fracture. This fracturing treatment was very successful, and resulted in a four fold increase in oil production.

In the above treatment, the kerosene and friction reducing and gelling additives were batch mixed prior to injection of the gelled fluid and suspended sand into the formation to be fractured. The gel was observed to develop within a few minutes after addition of the gelling components. In batch mixing, the alkyl orthophosphate ester and the aqueous sodium aluminate solution can be added simultaneously, but prior to addition to the hydrocarbon to be gelled, these reactants must be kept separated and not allowed to premix. If desired, the hydrocarbon fluid, the alkyl orthophosphate ester and sodium aluminate may be continuously mixed rather than batch mixed. To obtain optimum results through continuous mixing, special equipment must be used.

Having described our invention, what we claim and desire to protect by Letters Patent is:

1. The method of decreasing the pressure drop and therefore lessening the energy requirement to move a confined organic liquid, due to friction both within the liquid itself and between the liquid and confining walls, comprising admixing with said liquid the aluminum salt of a monoaliphatic-substituted orthophosphate ester, dialiphatic-substituted orthophosphate ester or mixture thereof, the aliphatic radicals are independently $C_1$ to $C_{20}$ alkyls, or $C_2$ to $C_{20}$ alkenyls or alkynyls, the amount of said salt employed between about 0.5 and about 100 pounds per thousand gallons of liquid being so treated.

2. The method according to claim 1 wherein said salt is a monoaliphatic orthophosphate ester wherein one substituent is H and the other is selected from $C_1$ to $C_{20}$ alkyls, or $C_2$ to $C_{20}$ alkenyls and alkynyls.

3. The method of decreasing the pressure drop and therefore lessening the energy requirement to move a confined organic liquid, due to friction both within the liquid itself and between the liquid and confining walls, comprising admixing with said liquid the aluminum salt of a mono-, or dialiphatic-substituted orthophosphate ester or mixture thereof, the aliphatic radicals are independently $C_1$ to $C_{20}$ alkyls, or $C_2$ to $C_{20}$ alkenyls or alkynyls, and wherein the aliphatic radicals independently contain carbon chains of different lengths, the amount of said salt employed between about 0.5 and about 100 pounds per thousand gallons of liquid being so treated.

4. The method according to claim 3 wherein at least one said aluminum salt is an alkyl alkenyl orthophosphate.

5. The method according to claim 3 wherein both of said aliphatic substituents of said dialiphatic-substituted orthophosphate ester are alkyls.

6. The method according to claim 3 wherein said salt is a dialiphatic orthophosphate ester wherein one radical is selected from $C_1$ to $C_3$ alkyls and the other is selected from $C_8$ to $C_{18}$ alkyls.

7. The method of fracturing a subterranean formation employing an organic fracturing fluid to create and improve flow channels therein wherein pressure drop of the fracturing fluid due to friction is greater than desired which comprises admixing with said organic fluid an effective amount of an aluminum salt of mono-, or dialiphatic-substituted orthophosphoric ester, or mixtures thereof wherein the aliphatic groups are independently selected from the class consisting of $C_1$ to $C_{20}$ alkyls or $C_2$ to $C_{20}$ alkenyls and alkynyls, to lessen the pressure drop caused by said fracting fluid and injecting the so-treated organic fluid down the wellbore and into the formation at sufficient pressure to fracture the formation.

8. The method of fracturing a subterranean formation penetrated by a wellbore employing a gelled organic fracturing fluid to create and improve flow channels therein which comprises: admixing with said organic fluid a gelling quantity of an aluminum salt of a mono- , or dialiphatic-substituted orthophosphoric acid ester wherein the aliphatic groups are independently $C_1$ to $C_{20}$ alkyls, or $C_2$ to $C_{20}$ alkenyls or alkynyls, and injecting the gelled organic fluid down the wellbore and into the formation at sufficient pressure to fracture the formation.

9. The method according to claim 8 wherein the gelled organic fluid contains hard particulate material to act as a proppant.

10. The method according to claim 9 wherein said hard particulate material is sand.

11. The method according to claim 9 wherein the organic fluid is kerosene.

12. The method according to claim 9 wherein the organic fluid is diesel oil.

13. A method of fracturing a subterranean formation penetrated by a wellbore, employing as a fracturing fluid an organic liquid, which comprises:
  a. separately admixing with said organic liquid a mono- or dialiphatic-substituted orthophosphoric acid ester and an aluminum compound which reacts with the ester in situ in the organic liquid to form an aluminum salt of said ester which gels the organic liquid, the ester and aluminum compound being provided in a total amount and in a specific weight ratio to gel the organic liquid; and,
  b. pumping the gelled organic liquid down the wellbore and into the formation at sufficient pressure to fracture the formation.

14. The method as defined in claim 13 including in addition mixing a propping agent into the organic liquid.

15. The method of fracturing a fluid-bearing subterranean formation employing an organic fracturing fluid to create and improve flow channels therein wherein pressure drop of the fracturing fluid due to friction is greater than desired, which comprises: admixing with said organic fluid an effective amount of an aluminum salt OF dialiphatic-substituted orthophosphoric acid ester wherein the aliphatic groups are independently selected from the class consisting of $C_1$ to $C_{20}$ alkyls, or $C_2$ to $C_{20}$ alkenyls and alkynyls, to lessen the pressure drop caused by said fracturing fluid and injecting the so-treated organic fluid down the wellbore and into the formation at sufficient pressure to fracture the formation.

16. A method of fracturing a subterranean formation which comprises:
  a. providing in an organic liquid a sufficient quantity of at least one aluminum salt of a dialiphatic orthophosphate ester, wherein the pair of aliphatic radicals are selected from the group consisting of ethyl and octyl, propyl and octyl, butyl and octyl, octyl and octyl, methyl and dodecyl, ethyl and dodecyl, propyl and dodecyl, dodecyl and dodecyl, methyl and tetradecyl, ethyl and tetradecyl, n-propyl and tetradecyl, ethyl and hexadecyl, octadecyl and n-propyl, butyl and octadecyl, hexyl and 9-octadecenyl, to provide a friction reduction of said organic liquid moving through a conduit of at least about 10 percent, and
  b. introducing the organic liquid containing the aluminum salt of the dialiphatic orthophosphate ester through a borehole and into contact with the subterranean formation at a pressure sufficient to fracture the formation.

* * * * *

PO-1050
(5/69)

UNITED STATES PATENT OFFICE
CERTIFICATE OF CORRECTION

Patent No. 3,757,864      Dated September 11, 1973

Inventor(s) D. L. Crawford, R. B. Earl & R. F. Monroe

It is certified that error appears in the above-identified patent and that said Letters Patent are hereby corrected as shown below:

Column 1, line 11, delete "expanded" and insert --expended--.

Column 1, line 26, delete "Pressues" and insert --Pressures--.

Column 5, line 4, delete "or" and insert --of--.

Column 5, line 15, delete "eight" and insert --weight--.

Column 11, line 45, delete "Salt O O".

Column 14, add Claims 17 & 18:

17. The method as defined in Claim 13 wherein the aluminum compound is sodium aluminate.

18. The method as defined in Claim 13 wherein the aluminum compound is sodium aluminate which is first dispersed in an aqueous solution.

Signed and sealed this 16th day of July 1974.

(SEAL)
Attest:

McCOY M. GIBSON, JR.            C. MARSHALL DANN
Attesting Officer               Commissioner of Patents